UNITED STATES PATENT OFFICE.

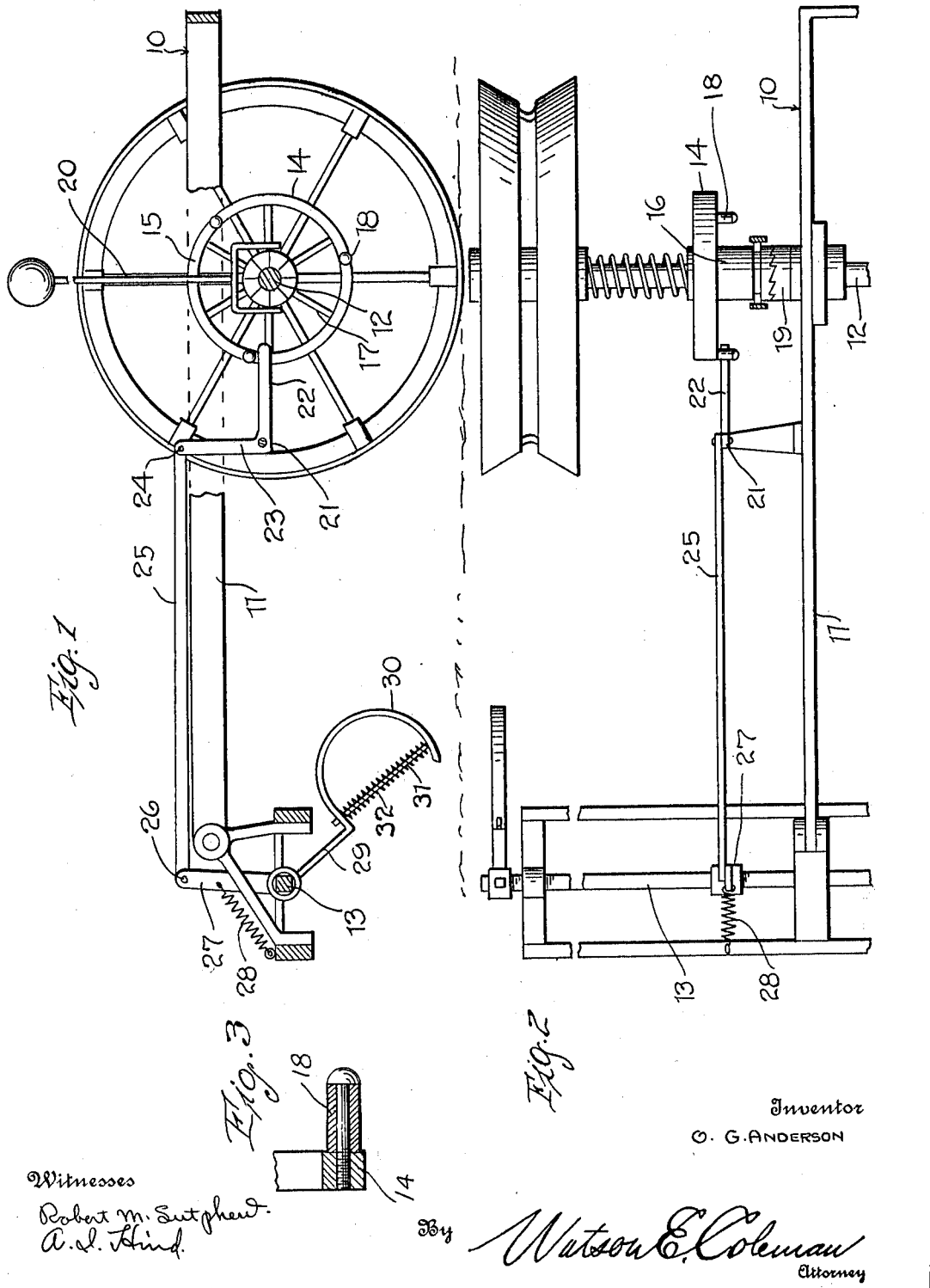

OLAF G. ANDERSON, OF MINDORO, WISCONSIN.

AGRICULTURAL IMPLEMENT.

1,096,586.  Specification of Letters Patent.  Patented May 12, 1914.

Application filed April 1, 1913.  Serial No. 758,220.

*To all whom it may concern:*

Be it known that I, OLAF G. ANDERSON, a citizen of the United States, residing at Mindoro, in the county of La Crosse and State of Wisconsin, have invented certain new and useful Improvements in Agricultural Implements, of which the following is a specification, reference being had to the accompanying drawings.

This invention relates to new and useful improvements in agricultural implements, and more especially to corn planters.

The primary object of the invention is to provide a device of this character having an improved marking attachment for connection therewith.

A further object of this invention is to improve and simplify devices of this character rendering them comparatively simple and inexpensive to manufacture, reliable and efficient in use, and readily operated.

With the above and other objects in view this invention resides in the novel features of construction, formations, combinations and arrangements of parts to be hereinafter more fully described, claimed and illustrated in the accompanying drawing, in which—

Figure 1 is a side elevation of my invention with the frame of the planter partly in section; Fig. 2 is a top plan view thereof; and Fig. 3 is a detail sectional view showing how the fingers are attached.

Referring to the accompanying drawing by similar characters of reference throughout the several views, the numeral 10 designates generally a portion of a corn planter. which consists of the supporting frame 11, in which is journaled the usual wheeled axle 12, and in the forward or draft end of which is supported the trip rod 13. A trip wheel 14 is loosely mounted upon the axle 12 and consists of a rim 15 supported by the usual hub 16 and spokes 17. The rim 15 is provided with inwardly extending trip fingers 18 arranged in equal-spaced relation to each other. A clutch 19 is slidably splined to the shaft 12, for engagement with the hub 16 of the wheel 14 whereby upon proper movement of the clutch through the medium of the weight lever 20, the wheel 14 can be connected to rotate with the shaft 12. A bell crank lever 21 is pivoted to one side of the frame 11, and has its horizontal arm 22 disposed in the path of the trip fingers 18, while its opposite oppositely extending arm 23 is pivoted, as at 24, to an operating rod 25, which in turn is pivoted at its opposite end as at 26 to a crank arm 27 formed upon the before mentioned trip shaft 13. This trip shaft 13 is held in its normal position by a spring 28, which connects the crank arm 27 with a convenient portion of the said frame 11. Obviously upon the rotation of the wheel 14, the trip shaft 13 will be operated to cause the planting of the seeds at predetermined intervals, arranged by the size of the said wheel 14 and the distance between the trip fingers 18 formed thereon.

A vertical swinging standard 29 is mounted in the frame, and operatively connected to the trip shaft 13, so that upon each movement of the said trip shaft to cause the planting of the seeds, the standard 29 will be forced downwardly. The lower end of the standard 29 is bent to form a substantially semi-circular marking foot 30, which is brought into engagement with the ground upon each depression of the standard 29, so that a line will be marked across the field whereby the operator of the machine can gage the next row to be planted. This marking foot 30 is provided with a guide rod 31 rigidly secured adjacent its lower end and extending upwardly to pass loosely through an opening formed adjacent the upper end thereof. Said guide rod 31 extends a slight distance beyond the upper end of said marking foot to allow for the movement of the latter and that portion of the same disposed within the arcuate marking foot is surrounded by a coil spring 32, the ends of the latter bearing against the upper and lower ends of the marking foot and tending to guide the latter in proper shape and position. It should be understood in this connection that various minor changes in the specific details of construction can be resorted to within the scope of the appended claim without departing from or sacrificing any of the advantages of the invention.

From the foregoing disclosures taken in connection with the accompanying drawing it will be manifest that a trip mechanism for corn planters is provided which will fulfil all of the necessary requirements of such a device.

Having thus fully described this invention what I claim as new and desire to protect by Letters Patent is:

In a checking device for corn planters, the combination with a frame, and a trip shaft operatively mounted thereon; of a vertically swinging standard secured at its upper end to said trip shaft and having the lower portion thereof bent arcuately to form substantially a semi-circular marking foot, a guide rod rigidly secured adjacent the lower end of the arcuate marking foot and extending upwardly to pass loosely through the upper portion of said foot, said rod extending slightly beyond the upper portion of the foot to allow for movement thereof, a coil spring encircling said rod between the upper and lower portions of said marking foot, the ends of said spring having engagement with said portions of the foot to retain the same in proper position, a wheel rotatably mounted on said frame, and means connecting said wheel and the trip shaft to intermittently operate the latter upon rotation of said wheel.

In testimony whereof I hereunto affix my signature in the presence of two witnesses.

OLAF G. ANDERSON.

Witnesses:
NORMAN DAHL,
ARTHUR STAVLO.

Copies of this patent may be obtained for five cents each, by addressing the "Commissioner of Patents, Washington, D. C."